Nov. 24, 1936.   H. NUTT ET AL   2,062,102
FRICTION CLUTCH
Filed Dec. 2, 1932
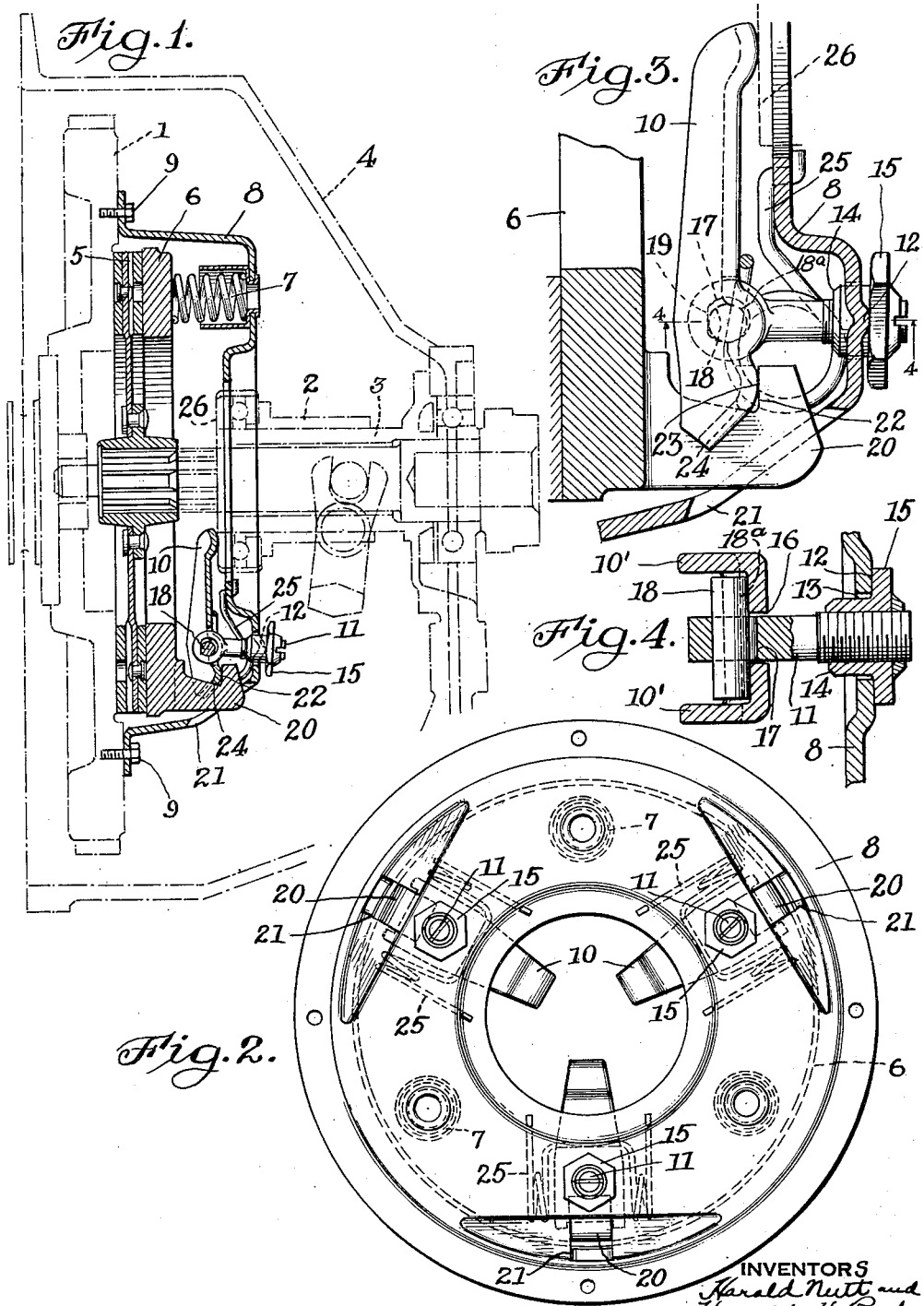

Patented Nov. 24, 1936

2,062,102

UNITED STATES PATENT OFFICE 2,062,102

FRICTION CLUTCH

Harold Nutt and Harold V. Reed, Chicago, Ill., assignors, by mesne assignments, to Borg-Warner Corporation, Chicago, Ill., a corporation of Illinois Application December 2, 1932, Serial No. 645,395

7 Claims. (Cl. 192—68)

This invention relates to friction clutches and it is particularly useful in that type of clutch which is employed in connection with the power plant of an automotive vehicle. Modern traffic, traveling and other conditions require that the clutch of an automotive vehicle should be operated more frequently than has been the practice in the past and this condition has naturally resulted in an increase of wear on the rubbing parts of the clutch which, in turn, has resulted in an increase in friction between the rubbing parts to such an extent that the force required to release the clutch is appreciably greater than formerly.

This application embraces certain improvements over the subject matter of our copending application Serial No. 645,392 which discloses and claims per se the novel features of the rolling pivot mounting for the clutch levers.

The primary object of this invention is to improve the action and thereby increase the efficiency of a friction clutch by reducing the friction between its moving parts.

Another object of the invention is to pivot and support the clutch levers in a novel manner to operate freely and without rubbing friction.

And a further object of the invention is to provide the clutch levers with floating supports to enable them to adjust themselves during the operation of the clutch to provide rolling contact with the pressure ring.

We have illustrated a selected embodiment of the invention in the accompanying drawing in which Fig. 1 is a vertical central sectional view showing a clutch embodying the invention, the housing and some other parts being shown in broken lines.

Fig. 2 is an elevation of the clutch.

Fig. 3 is an enlarged detail sectional view showing one of the lever units of the clutch, and Fig. 4 is a detail sectional view on the line 4—4 of Fig. 3.

Referring to the drawing, 1 is a flywheel rigidly mounted on a driving shaft (not shown) and 2 is a clutch release device operating on the sleeve 3 and within a housing 4. A clutch plate 5 is rigidly mounted on the driven shaft and is clamped by a pressure plate or ring 6 and springs 7 against the flywheel, whereby to impart motion from the driving shaft and flywheel through the clutch plate to the driven shaft. A cover 8 is fastened to the flywheel by bolts 9, and clutch levers 10 are pivotally mounted on bolts 11 supported movably in the cover and are adapted to be operated by the clutch release 2 to retract the pressure plate against the tension of the springs 7 and release the clutch. The invention may be used with clutch plates of different kinds and any suitable number of lever units may be provided.

A ridge or projection 12 is struck up or otherwise formed on the cover 8 and the cover is provided with an opening 13 through this projection to receive the bolt 11 and its nut 14 which has a head or peripheral flange 15 which pivots on the projection. That surface of the projection 12 which engages the head of the nut is rounded and the surface of the head of the nut which contacts with the projection is flat, and the opening 13 in the cover is somewhat larger than the nut which projects therethrough so that the bolt may pivot on the projection with a rolling contact between the projection and the head of the nut.

The inner end of the bolt 11 passes through an opening 16 in the clutch lever 10 and is provided with an opening or eye 17 to receive the pivot pin 18 which is retained in place by the flanges 10' on the clutch lever. In order that the pivot pin 18 may be held with its axis against movement along the axis of the lever 10, a cylindrical walled depression 18a may be formed transversely of the lever body within which the pin is partially received as best illustrated in Fig. 3. We prefer to employ a radius of curvature for the depression 18a that is equal to the radius of curvature of the wall of the pin 18 so that the pin may be held by surface contact with the lever from turning about its axis relative to the lever during lever oscillation. The opening 17 is larger than the pivot pin and is made nonconcentric with the pin in a suitable manner as by providing a flat 19 in one part of its wall. This mounting of the pivot pin 18 within the opening in the eyebolt 11, which opening is of larger diameter than the diameter of the pin to permit the pin to roll upon the flat wall 19 of the opening, provides for the pin the function of a floating pivot in that it is free of confinement during normal oscillating movement of the lever with which the pin is associated, as distinguished from a pivot of conventional form having a fixed axis relative to its bearing. The pressure ring is provided with a boss 20 which projects through an opening 21 in the cover whereby the pressure ring will be caused to revolve with the cover and flywheel to which it is fastened. The boss has a flat bearing face 22 and the lever has a rounded crown 23 to contact therewith. The outer end of the lever is recessed at 24 to receive the boss. A spring 25 is preferably arranged to engage the cover and lever to prevent the levers from rattling or chattering.

When the clutch release bearing 26 is operated, to the left in Figs. 1 and 3, by the clutch release device to release the clutch, the clutch levers will oscillate with a rolling action of the pivot pins on their bearings in the supporting bolts. Referring to Fig. 3, in the release movement of the clutch just described the pivot pin will turn counterclockwise and roll on the flat bearing 19 with a rolling contact. This movement of the clutch levers retracts the pressure ring against the springs 7 and releases the clutch. The crown 23 of the clutch lever rolls outwardly on the flat bearing face 22 of the boss. To accommodate the rolling action of the pivot pin on its bearing 19 and the rolling action of the crown on its bearing 22 without a rubbing action at either place, the supporting bolt is mounted to pivot on the projection 12 on the cover so that its free end will swing outwardly in the release operation of the clutch and enable the pivot pin to roll on its bearing and the crown to roll on its bearing without causing the lever to move bodily inwardly or outwardly. When pressure on the clutch release device is relieved and the springs 7 throw the clutch in engagement, the bosses on the pressure plate will cause the levers to oscillate back to their normal position as shown in the drawing. The invention provides a simple and efficient means for supporting the clutch levers to operate easily and accurately without rubbing friction, there being rolling contact where the supporting bolts are mounted in the cover, and where the lever pivots operate in their bearings, and where the levers engage the pressure rings.

We have shown and described the invention in one form and in one type of automotive clutch but it may be embodied in other forms and in other types of clutches and we reserve the right to make all such changes and modifications as may be necessary or desirable for these purposes within the scope of the following claims:

We claim:

1. A friction clutch comprising a pressure ring, a support adapted to swing and having a flat bearing, a lever for operating said pressure ring, and a pivot pin for said lever and operating with a rolling action on said bearing.

2. A friction clutch comprising a pressure ring, a support adapted to swing and having a flat bearing, a lever for operating said pressure ring, and a pivot pin for said lever and operating with a rolling action on said bearing, said lever having direct rolling contact with said pressure ring.

3. A friction clutch comprising a pressure ring, a support adapted to swing, and a lever having a rolling pivot on said support to operate the pressure ring, said ring having a flat bearing and said lever having a rounded surface engaging said bearing to operate with a rolling contact thereon.

4. A friction clutch comprising a pressure ring, a lever for operating the pressure ring, a supporting bolt mounted to swing through an arc in a direction parallel with the longitudinal axis of said lever and providing a bearing surface, and a pivot for said lever about the axis of which said lever may oscillate, said pivot having a rolling contact with the bearing surface on said supporting bolt.

5. A friction clutch comprising a pressure ring, a lever for operating the pressure ring, a supporting bolt mounted to swing through an arc in a direction parallel with the longitudinal axis of said lever and providing a bearing surface, a pivot for said lever about the axis of which said lever may oscillate, said pivot having a rolling contact with the bearing surface on said supporting bolt, and means associated with said lever and with said pressure ring providing a direct rolling contact between said lever and said pressure ring.

6. A friction clutch comprising a pressure ring, a cover, a lever for operating said pressure ring, a support mounted upon said cover to swing through an arc parallel with the longitudinal axis of said lever, said lever having a rolling pivot, about the axis of which said lever may oscillate, in rolling engagement with said support, and said lever having direct rolling contact with said pressure ring.

7. A friction clutch comprising a pressure ring, a lever to operate said ring, a cover having an opening, a support projecting through said opening, means providing rocking movement for said support on said cover, and means providing rolling engagement between said lever and said support, said last named means providing an axis of oscillation for said lever movable laterally with respect to said bearing surface during lever operation.

HAROLD NUTT.
HAROLD V. REED.